United States Patent
Sadasivarao et al.

(10) Patent No.: US 11,539,585 B2
(45) Date of Patent: Dec. 27, 2022

(54) SYSTEM AND METHOD OF USE OF EXTENSIBLE NETWORK ELEMENT SOFTWARE AGENTS FOR STATE AND NETWORK VERIFICATIONS IN PACKET OR OPTICAL TRANSPORT NETWORKS

(71) Applicant: Infinera Corp., Sunnyvale, CA (US)

(72) Inventors: Abhinava Shivakumar Sadasivarao, San Ramon, CA (US); Loukas Paraschis, Menlo Park, CA (US); Sharfuddin Syed, San Jose, CA (US); Robert Maher, Campbell, CA (US)

(73) Assignee: Infineraa Corporation, San Jose, CA (US)

( * ) Notice: Subject to any disclaimer, the term of this patent is extended or adjusted under 35 U.S.C. 154(b) by 0 days.

(21) Appl. No.: 17/383,209

(22) Filed: Jul. 22, 2021

(65) Prior Publication Data

US 2022/0029885 A1  Jan. 27, 2022

Related U.S. Application Data

(60) Provisional application No. 63/055,286, filed on Jul. 22, 2020.

(51) Int. Cl.
*H04L 41/08* (2022.01)
*H04L 41/0816* (2022.01)
(Continued)

(52) U.S. Cl.
CPC ...... *H04L 41/0816* (2013.01); *H04J 14/0227* (2013.01); *H04L 41/0869* (2013.01); *H04Q 11/0066* (2013.01); *H04Q 2011/0081* (2013.01)

(58) Field of Classification Search
CPC ...................................................... H04L 41/08
See application file for complete search history.

(56) References Cited

U.S. PATENT DOCUMENTS 9,419,854 B1 * 8/2016 Wang ..................... H04L 41/30
10,542,336 B2   1/2020 Paraschis et al.
(Continued)

OTHER PUBLICATIONS

Sadasivarao et al., "Demonstration of Extensible Threshold-Based Streaming Telemetry for Open DWDM Analytics and Verification," in Optical Fiber Communication Conference (OFC) 2020, OSA Technical Digest, Optical Society of America, 2020, paper M3Z.5.
(Continued)

*Primary Examiner* — Shi K Li
(74) *Attorney, Agent, or Firm* — David L. Soltz

(57) ABSTRACT

Methods for, and network elements in, packet or optical transport networks are disclosed, including a network element comprising non-transitory computer readable medium storing computer-executable instructions configured as one or more software agents that when executed with computer hardware: determine a state of the network element, comprising comparing a current state of transient properties of the network element against a predetermined, expected state of the transient properties of the network element; and verify a state of other network elements or paths in the transport network by comparing a current state of one or more network-level constraints of the other network elements or paths against a predetermined, expected state of the one or more network-level constraints on the other network elements or paths. The computer hardware may further positively or negatively acknowledge received instructions to apply a configuration to the network element based on the determination and/or verification.

20 Claims, 7 Drawing Sheets

(51) Int. Cl.
　　　*H04J 14/02*　　　(2006.01)
　　　*H04Q 11/00*　　　(2006.01)
　　　*H04L 41/0869*　　(2022.01)

(56) References Cited

U.S. PATENT DOCUMENTS

2013/0336118 A1* 12/2013 Shaw ............... H04L 41/0813
　　　　　　　　　　　　　　　　　　　　　370/235
2018/0220210 A1* 8/2018 Paraschis ........... H04Q 11/0062

OTHER PUBLICATIONS

Sadasivarao et al., "Demonstration of Advanced Open WDM Operations and Analytics, based on an Application-Extensible, Declarative, Data Model Abstracted Instrumentation Platform," in Optical Fiber Communication Conference (OFC) 2019, OSA Technical Digest, Optical Society of America, 2019, paper M3Z.1.

Hrbek et al., "Scaling the Facebook backbone through Zero Touch Provisioning", Networking & Traffic (downloaded from the Internet at https://engineering.fb.com/2018/05/21/networking-traffic/scaling-the-facebook-backbone-through-zero-touch-provisioning/), May 21, 2018.

Guha et al., "Machine-verified network controllers," PLDI, 2013.

Panda et al., "New Directions for Network Verification", 1st Summit on Advances in Programming Languages (SNAPL), 2015.

Steen et al., Chapter 7, "Consistency and Replication", Distributed Systems, Third Edition 2017.

Coulouris et al., Chapter 18: "Replication", Distributed Systems Concepts and Design, Fifth Edition, 2012.

Sadasivarao et al., "Optonomic: Architecture for Secure Autonomic Optical Transport Networks," 2019 IFIP/IEEE Symposium on Integrated Network and Service Management (IM), 2019.

Sadasivarao et al., "Demonstration of Extensible Disaggregated NE Management based on a SONiC-compliant Software-Agent Optical OpenConfig/gNMI Telemetry Go Implementation.", in Optical Fiber Communication Conference (OFC) 2020, OSA Technical Digest (Optical Society of America, 2021), paper M1B.4.

ITU-T, "Interfaces for the Optical Transport Network (OTN)", G.709 Recommendation, G.709-v3, Dec. 2009.

ITU-T, "Architecture of optical transport networks", G.872, Nov. 2001.

Mannie, E., RFC 3945, "Generalized Multi-Protocol Label Switching (GMPLS) Architecture", Oct. 2004.

Awduche et al., RFC 3209, "RSVP-TE: Extensions to RSVP for LSP Tunnels", Dec. 2001.

Geyer et al., "Channel Parameter Estimation for Polarization Diverse Coherent Receivers," IEEE Photonics Technology Letters, vol. 20, No. 10, pp. 776-778, May 15, 2008, doi: 10.1109/LPT.2008.921104.

* cited by examiner

SYSTEM AND METHOD OF USE OF EXTENSIBLE NETWORK ELEMENT SOFTWARE AGENTS FOR STATE AND NETWORK VERIFICATIONS IN PACKET OR OPTICAL TRANSPORT NETWORKS

CROSS-REFERENCE TO RELATED APPLICATIONS

This application claims priority to U.S. Provisional Patent Application Ser. No. 63/055,286, filed Jul. 22, 2020, entitled "Mechanisms for Using Extensible Network Element Software Daemons to Enhance Packet-Optical Transport Network Verification," the entire contents of which are hereby expressly incorporated herein by reference.

FIELD OF THE DISCLOSURE

The disclosure generally relates to methods and apparatuses for network element state verification and transport network verification using software agents running on network elements within transport networks. Though the systems and methodologies set forth herein are in the context of Wavelength Division Multiplexing (WDM) networks, such methodologies may be applied to different types of transport networks including packet transport networks (for example, IP, MPLS, MPLS-TP) and other types of optical transport networks (for example, OTN).

BACKGROUND

Typically, vendors for transport networks package a collection of data, control, and management plane functions, implemented as a collection of firmware and/or software that is used to operate a Network Element in the transport network. Network Elements may include, for example, a router, switch, server, or an optical Network Element (NE), or other device in a transport network. A default software/firmware bundle from the vendor may be referred to as a Network Element Network Operating System (NE NOS). Usually, software modules are implemented by the vendor, then packaged and sold to the operators with Network Element hardware.

In legacy networks, new features are enabled as a result of the vendor developing additional capabilities, made available to the operator via software releases. However, one problem with current systems is that the operator of the Network Element is constricted by the vendor's software development lifecycle and timelines; which may impact the operator's ability to innovate and/or make changes. Additionally, it constricts the operator's ability to introduce features within the operator's timeline (decoupled from the vendor's development cycle) and maintain control over any valuable intellectual property without having to divulge details to the vendor.

In transport networks, network verification, which utilizes principles of computer verification, refers to the practice of checking for correctness of network-level invariants (also referred to as constraints) for network elements in the transport network, and consequently, the network itself. Correctness refers to the closeness (or, divergence) of the expected state to (or from) the observed state. The expected state may also encompass one or more invariants, where violation of the invariants may impact the network, typically adversely. Local, NE-level, verification may be necessary but not sufficient.

The primary aim of verification is typically to detect potential violations (also referred to as misconfigurations) of predetermined variables by a proposed configuration. The violations can then be prevented by not implementing the proposed configuration, and thereby maintaining the established invariants.

Verification may be static (such as by performing checks before deployment of a network) or dynamic (such as by continuously, or repeatedly, checking to ensure correctness before applying new configurations in a running network).

Typically, a transport network (or a SDN controller in the transport network) relies on individual network elements to enact configurations, re-configurations, and validation operations. However, a dramatic increase in network traffic, complexity, and employed network element capabilities, has led to a dramatic increase of opportunities for misconfigurations. For example, if a network element employs a configuration for which it, or the network itself, is not capable, then the performance of the network may suffer, or fail. Misconfigurations can significantly impact the network performance, availability, and security. Network verification can help pre-validate configurations and avoid any potential issues. However, a need exists for systems and methods that determine network element (NE) state for network verification in a manner that simplifies rather than complicates network configuration changes, while providing more control at the network element operator level.

SUMMARY

Systems and methods of use of extensible network element software agents for state and network verifications in packet or optical transport networks are disclosed. The problem of misconfiguration and resulting failures in transport networks is addressed through the use of software agents executed on network elements to verify the state of the network elements and of the transport network before applying configurations, which grants greater control to operators for extending NE-level functions and correctness criteria to improve network verification.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
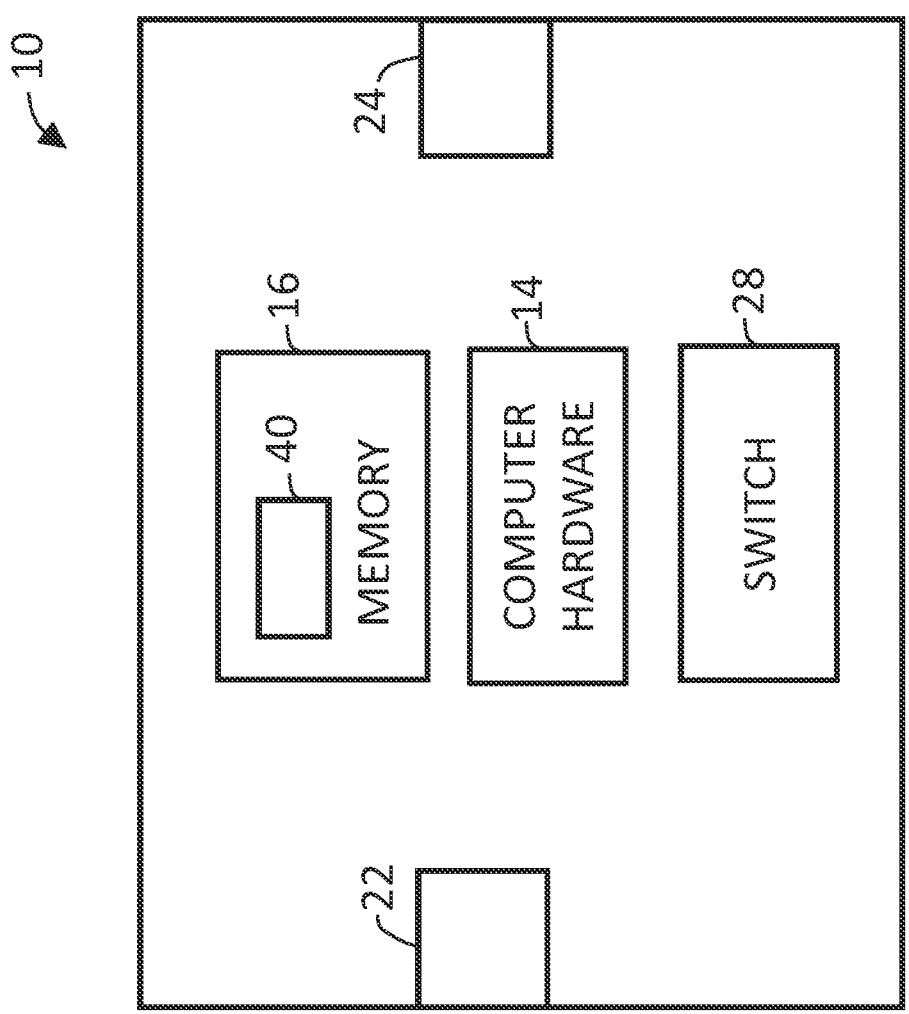
FIG. 1 is a block diagram of an exemplary network element in accordance with one aspect of the present disclosure.

The following detailed description refers to the accompanying drawings. The same reference numbers in different drawings may identify the same or similar elements.

The mechanisms proposed in this disclosure circumvent the problems described above. In one implementation, an exemplary method for the use of software agents executed on network elements to verify the state of the network elements and of a transport network before applying configurations may comprise: executing, on computer hardware in a network element in a transport network, computer-executable instructions configured as one or more software agents, the computer-executable instructions causing the computer hardware to: receive instructions to apply a configuration to the network element; determine a state of the network element, comprising comparing a current state of transient properties of the network element against a predetermined, expected state of the transient properties of the network element; verify a state of one or more other network elements or paths in the transport network by comparing a current state of one or more network-level constraints of the one or more other network elements or paths against a predetermined, expected state of the one or more network-level constraints on the one or more other network elements or paths; subsequent to determining the state of the network element and verifying the state of the one or more other network elements or paths in the transport network, determine that the current state of the network element meets the predetermined, expected state, and determine that the current state of the one or more network-level constraints of the one or more other network elements or paths meets the predetermined, expected state of the one or more network-level constraints on the one or more other network elements or paths; and positively acknowledge the instructions to apply the configuration.

In one implementation, an exemplary method for the use of software agents executed on network elements to verify the state of the network elements and of the network before applying configurations may comprise: executing, on computer hardware in a network element in a transport network, computer-executable instructions configured as one or more software agents, the computer-executable instructions causing the computer hardware to: receive instructions to apply a configuration to the network element; determine a state of the network element, comprising comparing a current state of transient properties of the network element against a predetermined, expected state of the transient properties of the network element; verify a state of one or more other network elements or paths in the transport network by comparing a current state of one or more network-level constraints of the one or more other network elements or paths against a predetermined, expected state of the one or more network-level constraints on the one or more other network elements or paths; detect a misconfiguration from the comparison of the current state to the predetermined, expected state of at least one of the current state of the network element and the current state of the one or more network-level constraints of the one or more other network elements or paths; and negatively acknowledge and/or reject the instructions to apply the configuration.

In one aspect of the present disclosure, a network element in a transport network is disclosed, the network element comprising: computer hardware comprising one or more of a computer processor, an application specific integrated circuit, a field programmable gate array (FPGA), a programmable circuit board, and a microcontroller; and one or more non-transitory computer readable medium storing computer-executable instructions configured as one or more software agents that when executed by the computer hardware cause the computer hardware to: determine a state of the network element, comprising comparing a current state of transient properties of the network element against a predetermined, expected state of the transient properties of the network element; and verify a state of one or more other network elements or paths in the transport network by comparing a current state of one or more network-level constraints of the one or more other network elements or paths against a predetermined, expected state of the one or more network-level constraints on the one or more other network elements or paths.

In some aspects, the one or more non-transitory computer readable medium storing computer-executable instructions that when executed by the one or more computer processors further cause the computer hardware to: receive instructions to apply a configuration to the network element; subsequent to verifying the state of one or more other network elements or paths in the transport network, detect a misconfiguration from the comparison of the current state to the predetermined, expected state; and negatively acknowledge and/or reject the instructions to apply the configuration.

In some aspects, the one or more non-transitory computer readable medium storing computer-executable instructions that when executed by the computer hardware further cause the computer hardware to: receive instructions to apply a configuration to the network element; subsequent to verifying the state of one or more other network elements or paths in the transport network, determine that the current state meets the predetermined, expected state; and positively acknowledge the instructions to apply the configuration.

In some aspects, the one or more non-transitory computer readable medium storing computer-executable instructions that when executed by the computer hardware further cause the computer hardware to: receive instructions to apply a configuration to the network element; subsequent to determining the state of the network element, detect a misconfiguration from the comparison of the current state to the predetermined, expected state; and negatively acknowledge and reject the instructions to apply the configuration.

In some aspects, the one or more non-transitory computer readable medium storing computer-executable instructions that when executed by the computer hardware further cause the computer hardware to: receive instructions to apply a configuration to the network element; subsequent to determining the state of the network element, determine that the current state meets the predetermined expected state; and positively acknowledge the instructions to apply the configuration.

The computer-executable instructions configured as one or more software agents may be part of an operating system of the network element. The computer-executable instructions may be configured as one or more software agents packaged as firmware running on the computer hardware without an operating system.

The transport network may be an optical transport network (OTN) or a packet transport network, for example.

Definitions

If used throughout the description and the drawings, the following short terms have the following meanings unless otherwise stated:

The term "extensible" as used herein means computer-executable instructions and/or computer systems designed to allow the addition of new capabilities and functionality.

Multiprotocol label switching (MPLS) is a scheme in a high-performance telecommunication network which directs and carries data from one node to the next node in the network. In MPLS, labels are assigned to data packets. Packet forwarding decisions from one node to the next node in the network are made based on the contents of the label for each data packet, without the need to examine the data packet itself.

MPLS-TP stands for Multi-protocol Label Switching Transport Profile.

OTN stands for Optical Transport Networks which includes a set of optical switch nodes which are connected by optical fiber links. ITU-T recommendations G.709 and G.872 define OTN interface requirements and network architecture, respectively.

LSP stands for Label Switched Path which is a path through a Multi-Protocol Label Switching network and/or a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tailend node).

WDM stands for Wavelength Division Multiplexing.

QoS stands for Quality of Service.

NE stands for Network Element.

NV stands for Network Verification.

NOS stands for Network Operating System.

NMS stands for Network Management System.

OSNR stands for Optical Signal to Noise Ratio.

PM stands for Performance Monitoring.

SDN stands for Software Defined Networking.

SoP stands for State of Polarization.

SV stands for State Verification.

NV stands for Network Verification. In order for a network to change from a first state to a second state, the network must be able to make the change. Network Verification determines that the network is capable of making the change and/or has the resources and capabilities of the resources. Network Verification uses knowledge of the original state (from the state verification) and the requirements of the second state to verify whether the network can move from the original state to the second state. The state of a network may include capabilities and status of network elements and/or network paths.

TE stands for Traffic Engineering which is a technology that is concerned with performance optimization of operational networks. In general, TE includes a set of applications mechanisms, tools, and scientific principles that allow for measuring, modeling, characterizing and control of user data traffic in order to achieve specific performance objectives.

TbST stands for Threshold-based Streaming Telemetry.

TDEQ stands for Time Domain Equalizer.

GMPLS stands for Generalized Multi-Protocol Label Switching which extends Multi-Protocol Label Switching to encompass time-division multiplexing (for example, SONET/SDH, PDH, G.709), wavelength (lambdas) multiplexing, and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945. Multiplexing, such as time-division multiplexing is when two or more signals or bit streams are transferred over a common channel. In particular, time-division multiplexing (TDM) is a type of digital multiplexing in which two or more signals or bit streams are transferred as sub-channels in one communication channel, but are physically taking turns on the communication channel. The time domain is divided into several recurrent timeslots of fixed length, one for each sub-channel. After the last sub-channel, the cycle starts over again. Time-division multiplexing is commonly used for circuit mode communication with a fixed number of channels and constant bandwidth per channel. Time-division multiplexing differs from statistical multiplexing, such as packet switching, in that the timeslots are returned in a fixed order and preallocated to the channels, rather than scheduled on a packet-by-packet basis.

A first node of a path in a transport network may be referred to as a headend node. A last node of a path in a transport network may be referred to as a tailend node.

IETF stands for Internet Engineering Task Force.

IP stands for Internet Protocol which is a protocol used for communicating data across a packet-switched internetwork using the Internet Protocol Suite, also referred to as TCP/IP.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Further, the phrase "based on" is intended to mean "based, at least in part, on" unless explicitly stated otherwise.

Also, certain portions of the implementations have been described as "components" or "circuitry" that perform one or more functions. The term "component" or "circuitry" may include hardware, such as a processor, an application specific integrated circuit (ASIC), or a field programmable gate array (FPGA), or a combination of hardware and software. Software includes one or more computer executable instructions that when executed by one or more component cause the component or circuitry to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As discussed above, applying a configuration to network elements in a transport network may result in misconfiguration and/or failure in the transport network when the state of the network element and/or the state of the network are unsuitable for the configuration. The present disclosure addresses these deficiencies with systems and methods using one or more extensible software agents on a network element to verify the state of a network element and/or the state of the network itself to avoid misconfiguration and/or failure in a transport network when a configuration or reconfiguration is to be applied to the network. Further, the systems and methods provide control to the operator of the network element to timely implement versatile software agents.

Figure 2:
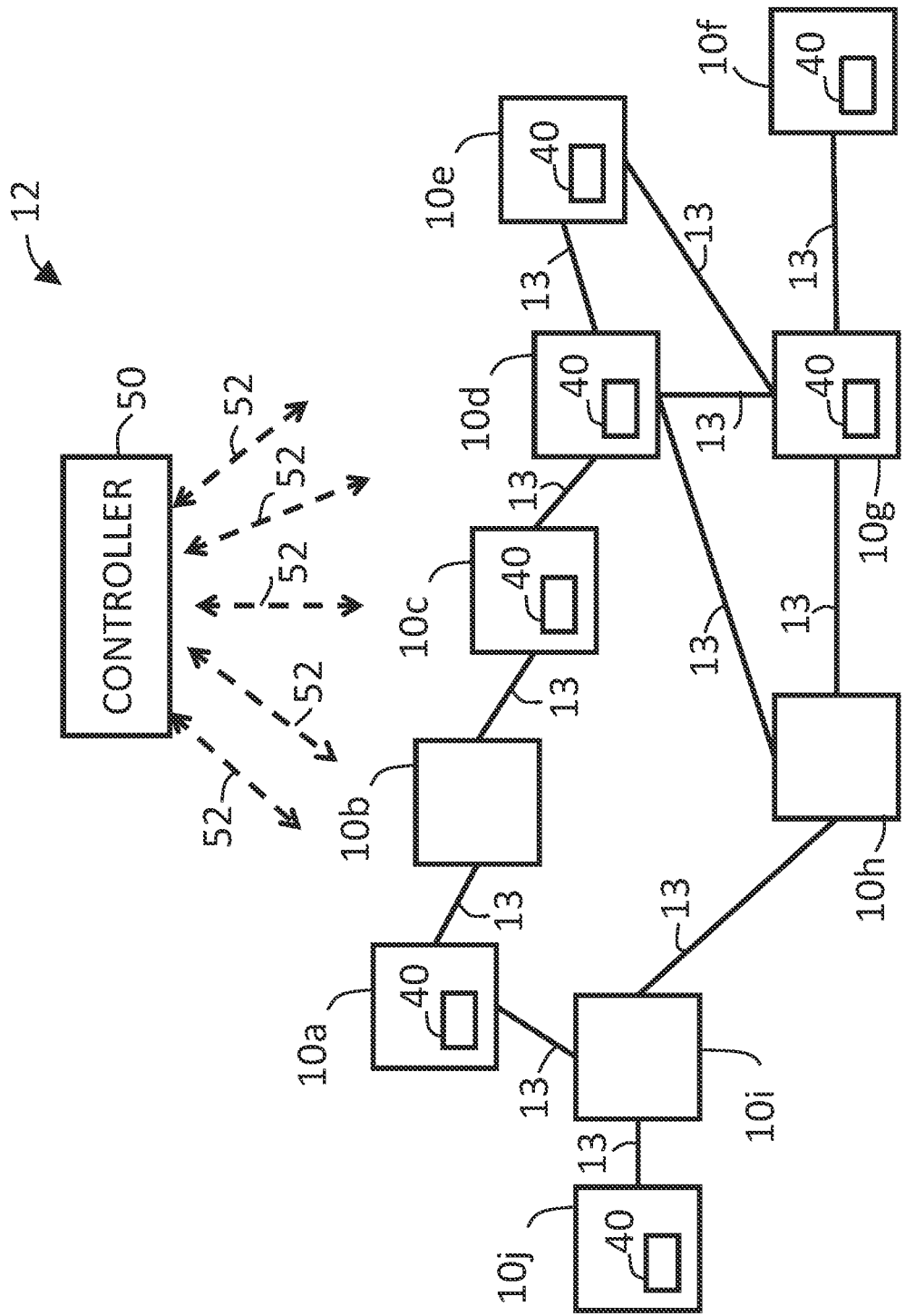
FIG. 2 is a block diagram of an exemplary transport network in accordance with one aspect of the present disclosure.

Referring now to the drawings, FIG. 1 is a schematic of an exemplary network element 10 (which also may be referred to as a node) from a transport network 12 (FIG. 2). The network element 10 may be one of two or more network elements 10 connected by one or more links 13 in the transport network 12. FIG. 2 illustrates an exemplary transport network 12 having a plurality of network elements 10a-10j connected by the links 13. It will be understood that the number of network elements 10 and links 13 shown is for explanatory purposes and that the transport network 12 may have two or more network elements 10 connected by one or more links 13. The links 13 may be optical and/or digital. For purposes of clarity, not all links 13 may be numbered in the illustrations.

The transport network 12 may be, for example, a packet transport network (such as IP, MPLS, or MPLS-TP packet transport networks) and/or an optical transport network (such as OTN or WDM transport networks). The transport network 12 may be considered as a graph made up of interconnected individual nodes (that is, the network elements 10).

A path in (and/or through) the transport network 12 may comprise one or more links 13 and network elements 10 that may be traversed through the network 12 from a first network element 10 to a second network element 10.

Returning to FIG. 1, the network element 10 may be configured to communicate data ("traffic") to other network elements 10 in the transport network 12. The network element 10 may be implemented as a single device having a shared power supply or may be implemented in a modular manner in which one or more of the components of the network element 10 are separated from one or more other components. Non-exclusive examples of network elements 10 include servers, routers, optical line terminals (OLTs), optical crossconnects (OXCs), optical line amplifiers, optical add/drop multiplexer (OADMs), reconfigurable optical add/drop multiplexers (ROADMs), and the like. FIG. 2 illustrates a variety of network elements 10, including two network elements 10j, 10f acting as routers, two network elements 10b, 10c acting as optical switches, and one network element 10a acting as a server, for example.

As shown in FIG. 1, the network element 10 may comprise computer hardware 14 configured to process computer-executable instructions. The computer hardware 14 may comprise one or more of: general-purpose computer processor(s), programmable circuit board(s), microcontroller(s), field programmable gate array(s) (FPGA), digital signal processor(s), application specific integrated circuit(s), and the like.

In some implementations, the network element 10 may comprise one or more non-transitory computer readable medium 16 (also referred to as non-transitory memory 16) configured to store computer-executable instructions. Additionally, or alternatively, computer-executable instructions may be stored externally to the network element 10. Exemplary non-transitory memory includes random access memory, read only memory, flash memory or the like. Such non-transitory memory can be electrically based or optically based.

The network element 10 may further comprise one or more of: input interfaces 22, output interfaces 24, and/or switches 28. In general, the input interfaces 22 are adapted to receive traffic from the transport network 12, and the output interfaces 24 are adapted to transmit traffic indicative of data onto the transport network 12. The switch(es) 28 may serve to communicate the traffic from the input interface(s) 22 to the output interface(s) 24. In some implementations, the input interfaces 22 and the output interfaces 24 are the same and/or may be a single interface that transmits and receives signals (for example, Ethernet signals coming in and going out of the interface).

The one or more non-transitory computer readable medium 16 may store computer-executable instructions configured as one or more software agents 40, which may be referred to herein in the singular (software agent 40) and the plural (software agents 40).

The software agent 40 may be developed and/or implemented on the network element 10 by an operator of the network element 10, rather than by a vendor of the network element 10 and/or of the network 12. The software agent 40 may be configured to allow extensibility of at least some of the base functions of the network element 10 that may be affected by software, such that the operator may customize functions of the network element 10 by creating, implementing, and/or utilizing the software agent 40 on the network element 10.

In some implementations, the software agent 40 may run on, and/or be part of, an operating system of the network element 10 and/or may include other forms of executable code as "software". Additionally, and/or alternatively, the software agent 40 may be implemented as a "firmware", that is, as executable instructions executed on the computer hardware 14 without an operating system. For example, the software agent 40 may be implemented as executable instructions to be executed by one or more circuit boards and/or microcontrollers.

In general, the software agent 40 may be configured to, when executed by the computer hardware 14, cause the computer hardware 14 to determine a state of the network element 10 and verify a state of the transport network 12, then to negatively or positively acknowledge instructions for configuration of the transport network 12 based on the determined state of the network element 10 and/or the verified state of the transport network 12.

More particularly, the software agent 40 may be configured, when executed by the computer hardware 14, to cause the computer hardware 14 to first determine a state of the network element 10. Determining a state of the network element 10 may comprise comparing a current state of transient properties of the network element 10 against a predetermined, expected state of the transient properties of the network element 10.

Values of the transient properties may be based on one or more of: persistent configuration parameters and independent, transient parameters. Transient properties may be ephemeral, such that the properties do not need to be persisted by the network element 10. One example of the transient properties of the network element 10 may be an operational state (enabled/disabled) of an optical channel terminated by the network element 10, or a LSP connected to the network element 10. Another example of the transient properties may be resource use of the network element 10 (such as computing resources), which can fluctuate over time.

Transient properties may also comprise Performance Monitoring parameters. One example of the transient properties of the network element 10 may be a measured optical channel receiver power (for example, −55 dBm . . . +55 dBm).

Transient properties may also comprise calculated or determined properties based on other parameters. For example, the software agent 40 may be configured to consume raw coherent DSP parameters (for example, the channel response estimated by adaptive digital filters inside the DSP ASIC), which can be exploited to determine a range of physical impairments, such as, but not limit to, fast changes in the State of Polarization (SoP), Polarization Dependent Loss (PDL) or Polarization Mode dispersion.

Additionally, the software agent 40 may be configured to add additional or different transient parameters for the network element 10 that are operator-specific and/or specific to the network element 10. The software agent 40 may be decoupled from the base operating system of the network element 10. For example, the software agent 40 may be an add-on software application (that is, an app), which may be installed or uninstalled independently of the base operating system of the network element 10.

Further, the software agent 40 may be configured to conduct network verification after determining the state of the transport network 12. The software agent 40 may conduct network verification by verifying a state of one or more other network elements 10, links 13, and/or paths in the transport network 12. Verifying the state of one or more other network elements 10 or paths in the transport network 12 may comprise comparing a current state of one or more network-level constraints of the one or more other network elements 10 or paths against a predetermined, expected state of the one or more network-level constraints on the one or more other network elements 10 or paths.

The network-level constraints may be changed or added. The network-level constraints may comprise one or more rule governing operation of the transport network 12. The network-level constraints may comprise global intents, rules, and/or policies that are enforced via the network elements 10 in the transport network 12.

For example, the required OSNR margin and latency on an end-to-end optical path with intermediate 2R/3R nodes (QoS) may be a network-level constraint. Another example of a network-level constraint may be avoidance (such as an exclusion list in an Explicit Router Object (ERO) such as described in RFC3209, "Extensions to RSVP for LSP Tunnels", December 2001) of a specific set of label switch routers in an MPLS LSP. Yet another example of network-level constraints includes contextual verification logic applicable to the network element 10, such as the network element type and/or the place in the overall transport network 12 (such as domain and/or geography) of the network element 10. Of course, it will be understood that other network-level constraints may be used.

Returning to FIG. 2, the transport network 12 may comprise one or more controller 50. The controller 50 may be a network-wide management entity that maintains the network-level constraints. Examples of the controller 50 include, but are not limited to, an SDN Controller or a Network Management System (NMS) or a combination thereof.

The network-level constraints may be defined at the controller 50. However, the controller 50 does not validate or enforce correctness criteria. Rather, the software agent(s) 40 within the network element(s) 10 carryout validation and enforcement. The controller 50 is simplified by having vendor-specific abstractions through the software agent 40 on the network element 10. Using the software agent(s) 40 on the network elements 10 makes the combination of parameters and vendor-specific logic exponentially smaller than if such customizations/augmentation were to be done at the controller layer.

The controller 50 may be configured to send and receive signals 52 to and from the network element(s) 10. Some signals 52 from the controller 50 may comprise instructions to apply a configuration (which may be an initial configuration or reconfiguration) to the network element(s) 10 and the network 12.

Parameters of the configuration may be data plane and/or control plane related. For example, the controller 50 may have a configuration to "Set optical carrier power to 2 dBm;" or to "Update TE Link admin cost to 100."

The network element 10 may be configured to receive the instructions via the signals 52 to apply the configuration to the network element 10, such as with the software agent 40.

The software agent 40 may be configured to cause the computer hardware 14 to determine a state of the network element 10 (that is, state verification), comprising comparing a current state of transient properties of the network element 10 against a predetermined, expected state of the transient properties of the network element 10. The software agent 40 may be configured to cause the computer hardware 14 to verify a state of one or more other network elements 10 or paths in the transport network 12 (that is, network verification) by comparing a current state of one or more network-level constraints of the one or more other network elements 10 or paths against a predetermined, expected state of the one or more network-level constraints on the one or more other network elements 10 or paths.

Subsequent to determining the state of the network element 10 (that is, state verification), the software agent 40 may cause the computer hardware 14 to acknowledge the instructions to apply the configuration, either negatively (that the configuration cannot be applied), temporarily negatively (that the configuration cannot be applied right now, but that the software agent 40 will check again), or positively (that the configuration can be applied now).

Subsequent to verifying the state of one or more other network elements 10 or paths in the transport network 12 (that is, the network verification), the software agent 40 may cause the computer hardware 14 to acknowledge the instructions to apply the configuration, either negatively (that the configuration cannot be applied), temporarily negatively (that the configuration cannot be applied right now, but that the software agent 40 will check again), or positively (that the configuration can be applied).

If the software agent 40 detects a misconfiguration from the comparison of the current state to the predetermined, expected state of either the network element 10 or the one or more other network elements 10 or paths in the transport network 12, then the software agent 40 may negatively acknowledge the instructions to apply the configuration. Further, the software agent 40 may reject the instructions to apply the configuration. The software agent 40 may not apply the configuration.

For example, if the controller 50 sends instructions to the network element 10 to apply a configuration to: "Increase per wavelength data rate to 800 Gb/s." The software agent 40 may cause the computer hardware 14 of the network element 10 to return a negative acknowledgement, such as, "Sorry, current observed link OSNR is insufficient to support requested data rate increase;" or "I can't apply right now, but will keep monitoring if situation improves."

In another example, the controller 50 may send instructions to the network element 10 to apply a configuration to: "Update TE Link admin cost to 100." The software agent 40 may cause the computer hardware 14 of the network element 10 to return a negative acknowledgement, such as, "Sorry, cannot updated admin cost since new LSPs setup would take a longer route and thereby, breaks latency criteria;" or "I can't update right now, but I could if other LSPs are torn-down later."

In some implementations, in a "fail-fast" model, the software agent 40 may determine/verify that the configuration cannot be applied and will negatively acknowledge the instructions to apply the configuration to the controller 50 immediately (that is, at the next available opportunity of the network element 10) after the determination is made.

In some implementations, the software agent 40 may continue to monitor for the existent situation to become conducive for application of the configuration. In an "eventually consistent model" the software agent 40 may determine that the configuration cannot be applied due to a lack of resources and/or the detection of a misconfiguration from the comparison of the current state to the predetermined, expected state of the network element 10 and/or the network 12; but the software agent 40 may monitor the current state (such as by checking the state of the network element 10 and/or the network 12 after one or more predetermined period of time) and, if the states do change to meet the predetermined, expected states, then the software agent 40 may positively acknowledge the instructions to the controller 50.

In some implementations, the software agent 40 may apply some of the configuration and continue to monitor and attempt to apply the configuration on the network element 10 over time.

In some implementations, the software agent 40 may first negatively acknowledge the configuration instructions, and then may positively acknowledge the configuration instructions. For example, if the network element 10 is in use and does not have the resources to apply the configuration at the time of the receipt of the instructions (such that the state of the network element 10 does not match the expected state at that time), or if there is a temporary misconfiguration of the network 12 (such that the state of the network 12 does not match the expected state at that time), the software agent 40 may first negatively acknowledge the configuration instructions. Then, for example, if resources of the network element 10 become available at a later time (such that the state of the network element 10 does match the expected state) and the state of the network 12 matches the expected state, then the software agent 40 may positively acknowledge the configuration instructions. The software agent 40 may apply the configuration.

In some implementations, the predetermined, expected state of the network element 10 and/or of the transport network 12 may be adjustable by one or more of: an operator of the network element 10 and a vendor of the network element 10. The predetermined expected state of the transport network 12 may include a threshold for the one or more network-level constraints. The threshold may be adjustable.

The operator may adjust the predetermined, expected state of the network element 10 and/or of the transport network 12 on a case-by-case basis or for predetermined circumstances or operational practices. For example, intents and verification rules for latency-aware LSP routing may be different from rules for enforcing end-to-end OSNR requirements. Additionally, there may be interaction (joint/multi-variate) between different correctness criteria.

Further, the software agent 40 and the predetermined, expected states may be adjustable based on operator-specific policies (that is, defined by the operator), or adjusted by the operators based on the constraints imposed by the hardware vendor (for example, the hardware vendor's immutable hardware design may force some constraints on the overall intents and consequently, the verification workflow).

In some implementations, verifying the state of one or more other network elements 10 or paths in the transport network 12 by comparing the current state of one or more network-level constraints of the one or more other network elements 10 or paths against the predetermined, expected state of the one or more network-level constraints on the one or more other network elements 10 or paths, may further comprise utilizing one or more of streaming telemetry, polling, and threshold-based streaming telemetry.

In some implementations, fewer than all of the network elements 10 in the transport network 12 include the software agent(s) 40.

Figure 3:
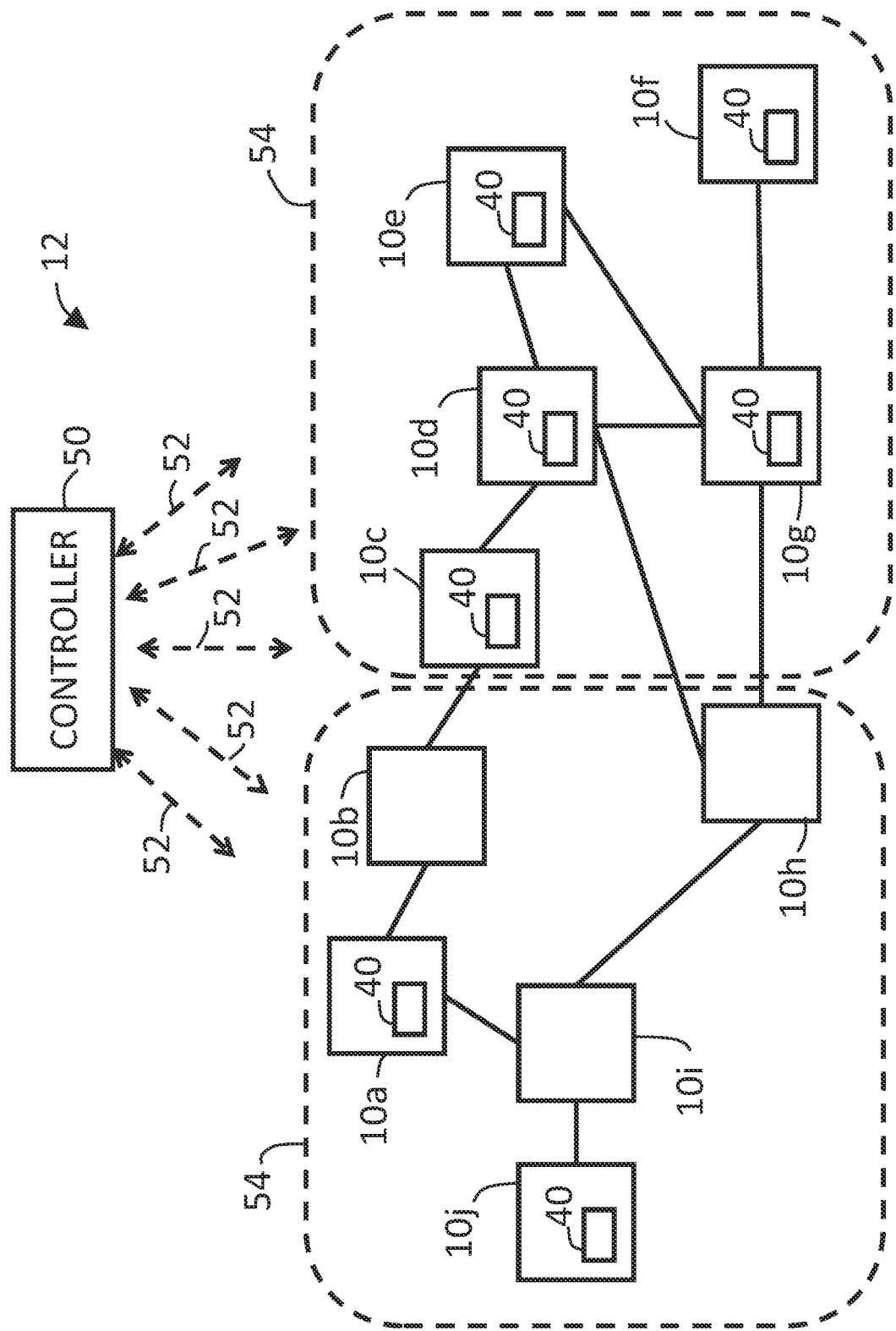
FIG. 3 is a block diagram of an exemplary transport network in accordance with one aspect of the present disclosure.
Figure 4:
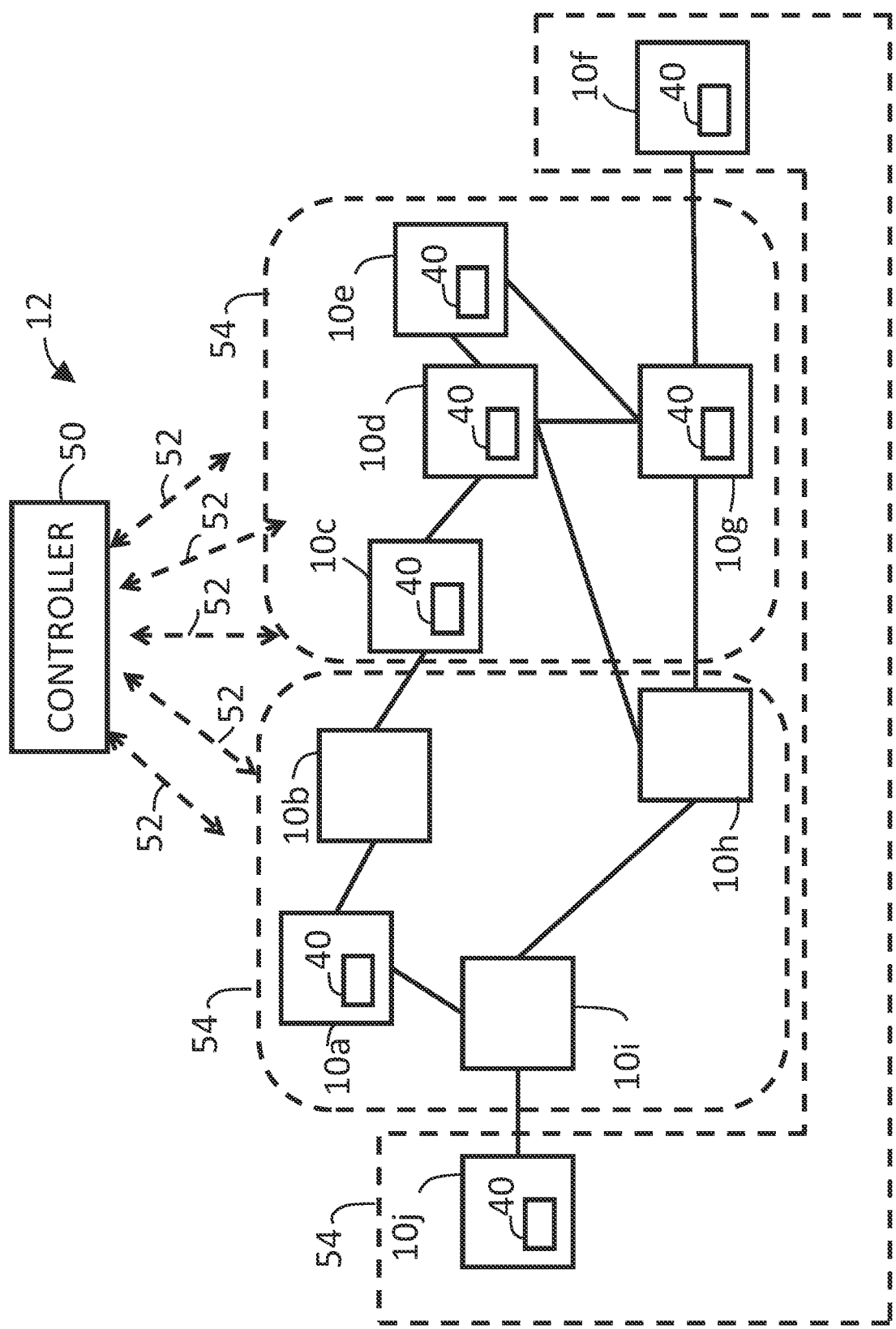
FIG. 4 is a block diagram of an exemplary transport network in accordance with one aspect of the present disclosure.

As shown in FIG. 3 and FIG. 4, in some implementations the transport network 12 may be comprise two or more domains 54.

Figure 5:
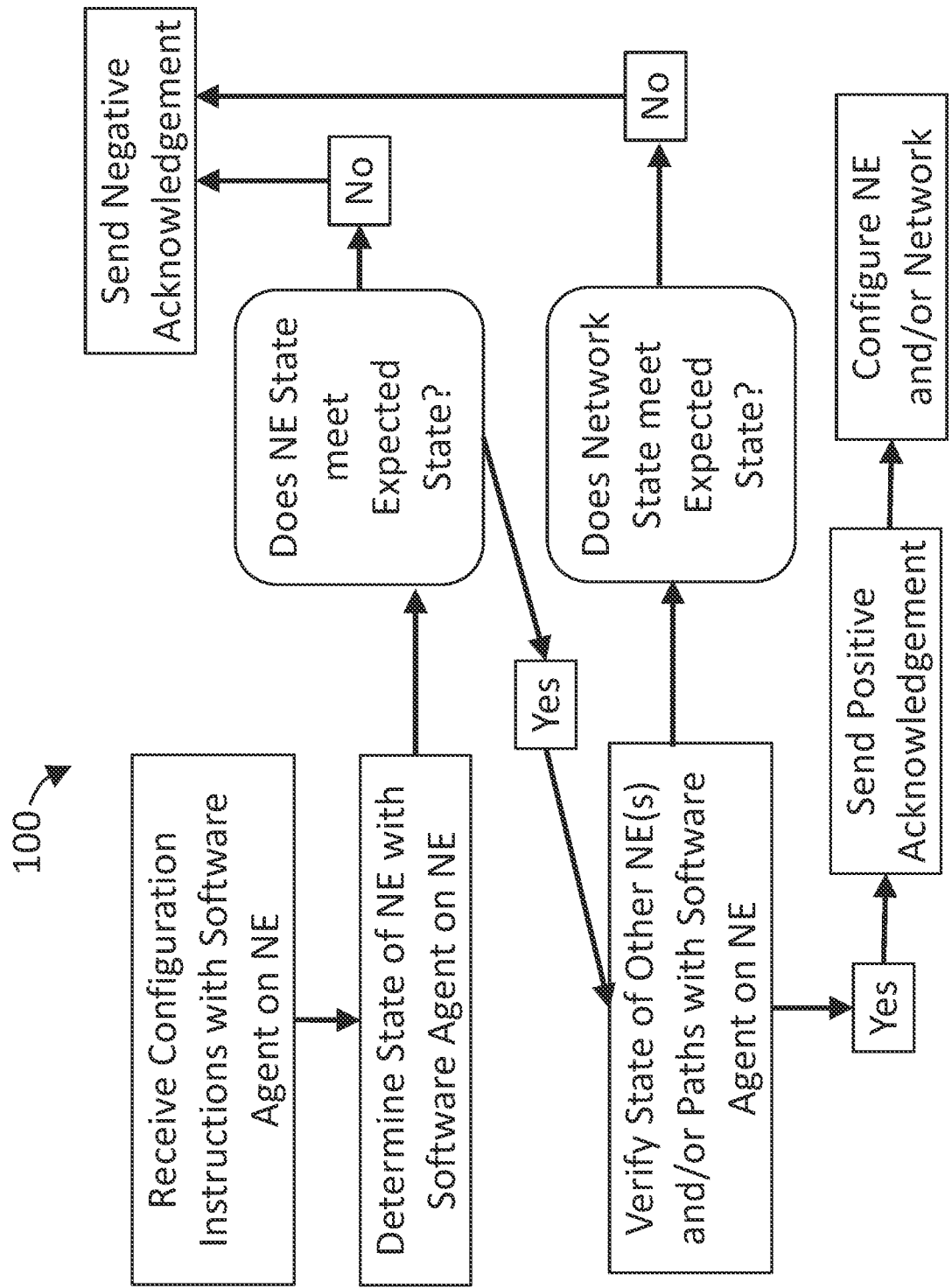
FIG. 5 is process flow diagram of an exemplary method in accordance with one aspect of the present disclosure.

Methods of use of the software agent 40 within exemplary transport networks 12 will now be described. As illustrated in FIG. 5, in general, an exemplary method 100 may comprise executing, on the computer hardware 14 in the network element 10 in the transport network 12, computer-executable instructions configured as one or more software agents 40, the computer-executable instructions causing the computer hardware 14 to: receive instructions (such as from the controller 50) to apply a configuration to the network element 10; determine a state of the network element 10, comprising comparing a current state of transient properties of the network element 10 against a predetermined, expected state of the transient properties of the network element 10; and verify a state of one or more other network elements 10 or paths in the transport network 12 by comparing a current state of one or more network-level constraints of the one or more other network elements 10 or paths against a predetermined, expected state of the one or more network-level constraints on the one or more other network elements 10 or paths.

Subsequent to determining the state of the network element and verifying the state of the one or more other network elements or paths in the transport network, the software agent 40 may determine that the current state of the network element 10 meets the predetermined, expected state, and determine that the current state of the one or more network-level constraints of the one or more other network elements 10 or paths meets the predetermined, expected state of the one or more network-level constraints on the one or more other network elements 10 or paths. Then the software agent may positively acknowledge the instructions to apply the configuration. The software agent may configure the network element 10 and/or other components of the transport network 12.

Subsequent to determining the state of the network element 10 and verifying the state of the one or more other network elements 10 or paths in the transport network 12, the software agent 40 may detect a misconfiguration from the comparison of the current state to the predetermined, expected state of at least one of the current state of the network element 10 and/or the current state of the one or more network-level constraints of the one or more other network elements 10 or paths; and negatively acknowledge the instructions to apply the configuration. The software agent 40 may reject the configuration.

In some implementations, subsequent to determining the state of the network element 10, the software agent 40 may detect a misconfiguration from the comparison of the current state to the predetermined, expected state and of the current state of the network element 10; and negatively acknowledge the instructions to apply the configuration, without proceeding to verify the state of the other network elements 10 or paths.

Some particular use cases will now be described. In one implementation, the software agent(s) 40 may be used for declarative configuration to simplify intent-based network control. Declarative configuration allows maintaining a global-state of the transport network 12. A controller 50, such as an SDN Controller of an operator, deals with network-level state changes without tracking the intermediate steps to get to a particular end-state. The states may be dictated by the operational policies of the operator. For example, the operator may wish to increase capacity to serve peak-hour traffic (for example, to re-route traffic during high-use periods to low-latency paths).

In declarative configuration, the controller 50 may generate a full-configuration for every NE 10 in the transport network 12 to enforce a specific end-state. Verification of the state of the network element 10 is a pre-condition for verifying the state of the transport network 12. In this implementation, an individual NE 10 receives this full-configuration of the current state and computes the difference between the incoming configuration instructions and the current state. The NE 10 may then apply the difference. When there is no difference between the new configuration and the current state, the NE 10 may treat the situation as a "no-op", and take no action.

With declarative configuration, since every state change generates configuration pushed to potentially every NE 10 in the transport network 12, a thorough verification helps to avoid misconfigurations (due to bugs or due to malicious actors in the transport network 12).

In some implementations, at the end of one declarative configuration state transition, the global state of the transport network 12 may be enacted by each NE 10 in the transport network 12 so that the network elements 10 are in a consistent end-state. Any inconsistencies in the desired global state versus that observed on the network elements 10 may likely violate the correctness (operational) criteria. In this case, the application of a configuration state is a transaction (all-or-nothing).

In a "Strongly Consistent Declarative Configuration Push", the controller 50 may push the full configuration to each individual NE 10 in a sequential manner or in parallel to all the network elements 10. The controller 50 may not declare the state transition "PASS" until each network element 10 has acknowledged application of the state.

In an "Eventually Consistent Declarative Configuration Push" the controller 50 may push the full configuration to the network elements 10 in the transport network 12, but does not require all positive acknowledgements from all the network elements 10 in the transport network 12 in order to proceed, on the expectation that the network elements 10 will eventually achieve the necessary state. This allows the controller 50 to move to other tasks.

In one use case, Threshold-based Streaming Telemetry (TbST) may be implemented via the software agent(s) 40 to improve traditional streaming telemetry by dynamically adapting the streaming interval based on the existing conditions on the network element 10. The threshold logic of the software agent 40 may be added "on top of" the native software of the network element 10, thereby extending the default streaming telemetry. TbST can improve network verification by streaming data faster or slower, allowing the controller 50 to be up-to-date with the state of the transport network 12 as soon as possible, thereby avoiding any configuration conflicts.

In one use case, API support from the operating system of the network element 10 may be used such that the software agent 40 may be pro-active/dynamic. The software agent 40 may provide northbound APIs to the operator to allow interacting with the software agent 40. The software agent 40 may use a southbound API to interact with the operating system of the network element 10 to configure/monitor. The southbound interface may be vendor-specific (proprietary) or an open/standard interface (POSIX APIs). Further, there may be an agent-to-agent east-west communication (i.e., a software agent 40 on one network element 10, communicating with another software agent 40 on another network element 10) that further improves verification. For example, the software agent 40 on a first network element 10a may observe worsening carrier Pre-FEC-BER. The software agent 40 may then communicate with the software agent 40 on another network element 10c, to check if the symptoms are local to the network element 10a, for example if the per wavelength received is too high or too low; or alternatively if there is a bigger issue that is occurring at some other point in the network 12

In one use case, the software agent 40 may use analytics to identify signatures that indicate potential issues and thereby improve verification accuracy, such as in pre-checks/pre-validation prior to application of a configuration. The software agent 40 may access a local (such as FDR) or a remote data pool to perform pre-check analysis. The data pool may be provided by the vendor (e.g., manufacturing data), or the operator (e.g., a collection of run time logs) or a combination of both. The analytics function may be conventional min/max/avg statistics or may use machine learning, for example.

Figure 6:
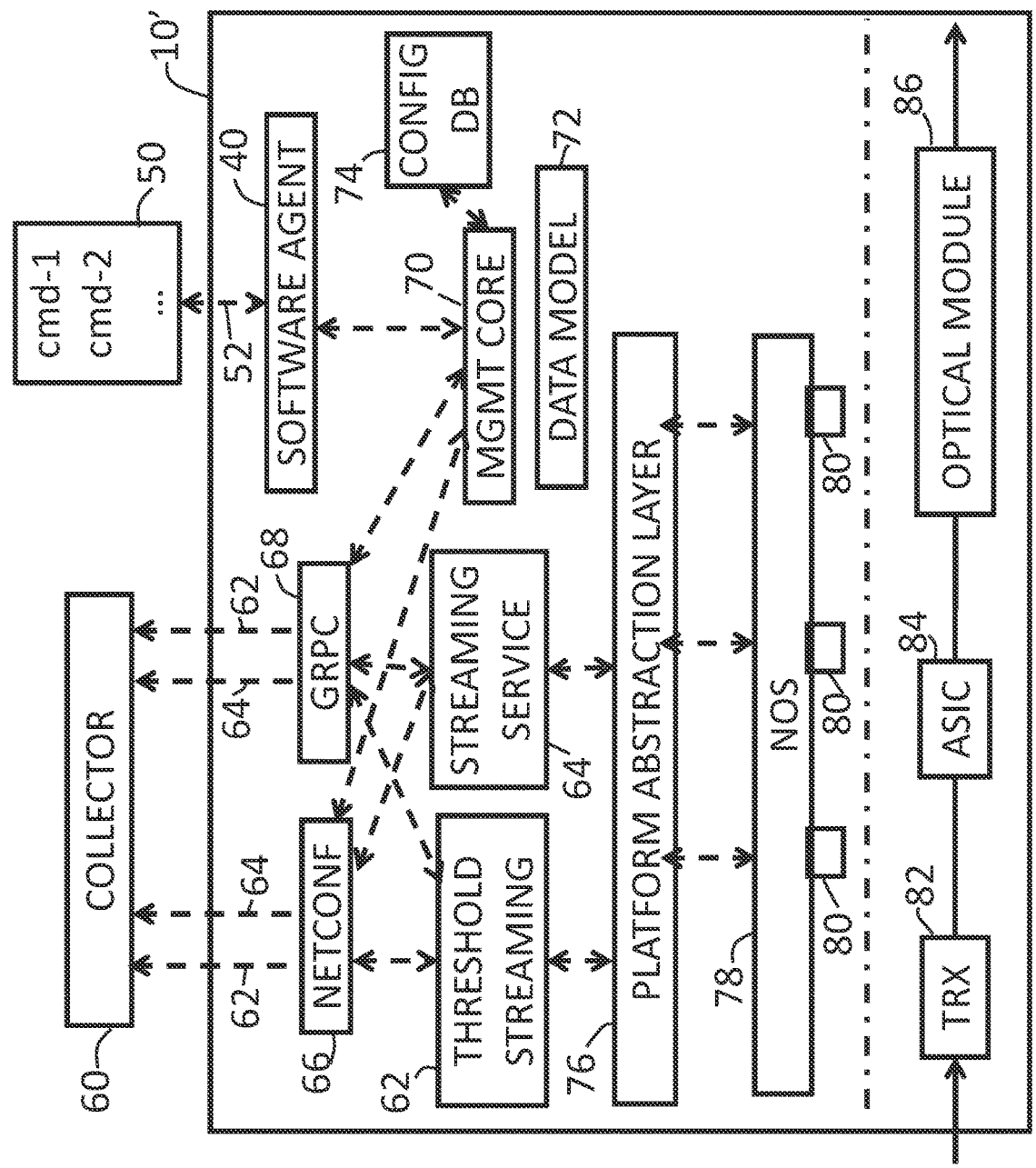
FIG. 6 is a block diagram of a use case of an exemplary software agent in an exemplary network element in accordance with the present disclosure.

FIG. 6 illustrates a use case of the software agent 40 in conjunction with an exemplary networking operating system software architecture on an exemplary network element 10' in communication with the SDN controller 50 and/or an analytics collector 60. The collector 60 may include an analytics, learning, and instrumentation platform. The exemplary network element 10' may be configured for threshold streaming 62 and/or for conventional streaming with a streaming service 64. The exemplary network element 10' may be configured with a management core 70, a NETCONF 66, a GRPC 68, a configuration database 74, a platform abstraction layer 76 (model driven and declarative), a YANG data model 72, a base networking operating system (NOS) 78, and one or more drivers 80. The exemplary network element 10' may comprise the computer hardware 14, such as one or more transceiver 82, DSP and Datapath ASIC 84, and optical module 86. The exemplary network element 10' may comprise the software agent 40 (such as previously described). The software agent 40 may receive command instructions from the controller 50 in a declarative configuration push. The software agent 40 may verify the state of the exemplary network element 10'.

Figure 7:
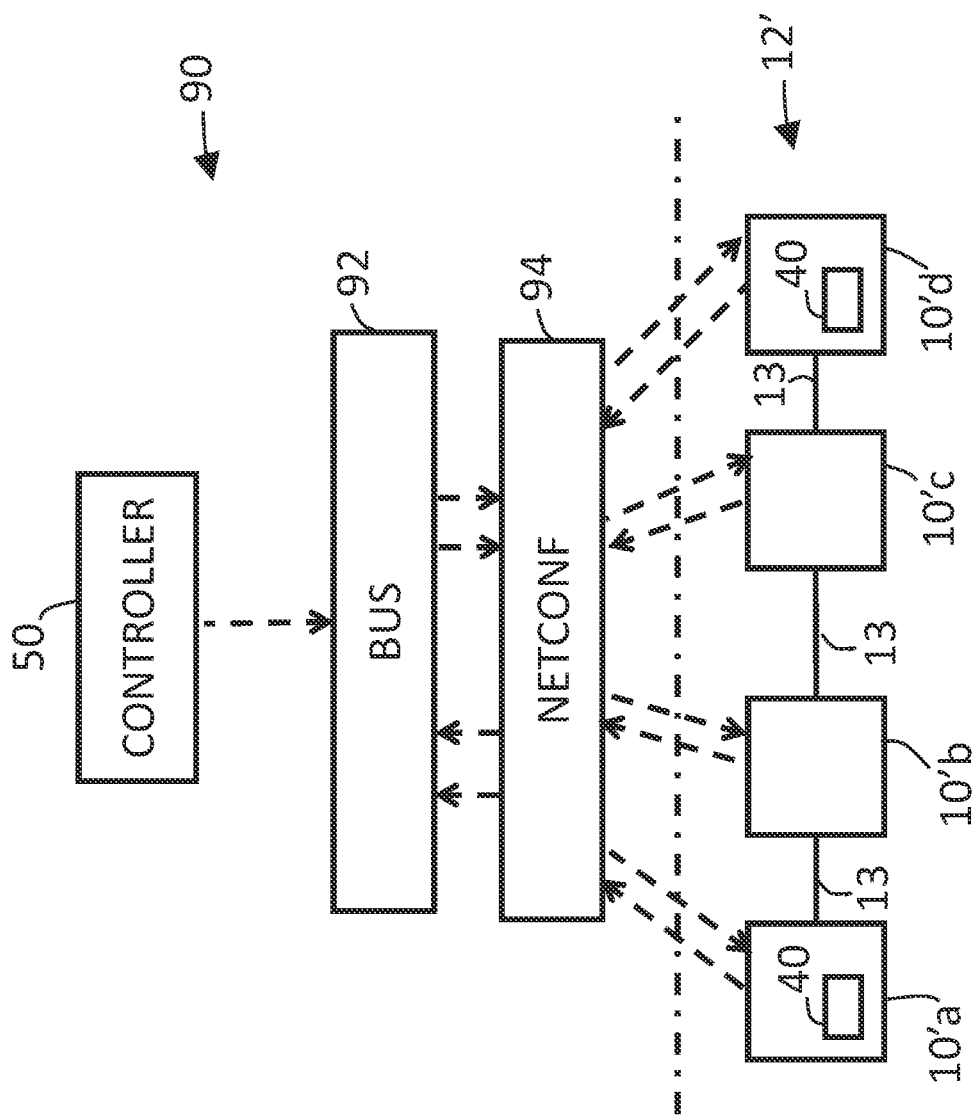
FIG. 7 is a block diagram of a use case of the exemplary network element of FIG. 6 in an exemplary transport network in accordance with one aspect of the present disclosure.

FIG. 7 extrapolates the use case illustrated in FIG. 6 to illustrate a use case in which the software agents 40 may be executed on multiple network elements 10', such as in the form of optical responders 10'a and 10'd, in an exemplary transport network 12', with other network elements 10'b and 10'c (which may or may not include the software agent(s) 40). The software agents 40 may implement threshold-based streaming telemetry, in which the rate of the streaming data is dynamically adapted (streamed faster or slowed down) based on the underlying state of the network element 10. The adaptive threshold allows the controller 50, such as a SDN Controller, to learn about the state of the transport network 12 faster, improving the network verification performance. The controller 50 may implemented to be integrated with other functions such as analytics, as represented in FIG. 7 by an SDN & Analytics Platform 90, which may also comprise, for example, a configuration and telemetry broker (NETCONF) 94, and a framework implementation of a software messaging bus 92.

Other use cases of the software agent 40 on the network elements 10 for verification include, but are not limited to, the following:

Extending network verification to handle initial commissioning (Day 0) to steady-state (Day N) operations;

Combining analytics and agent-based approach to allow a real-time planning tool to account for current state of the network prior to building new plans;

Improving proactive protection/restoration performance and user-experience in packet and/or optical transport networks 12;

Improving packet-optical transport network margin validation;

Triggering periodic OTDR traces to monitor OSNR and accept/deny new service provisioning requests that violate end-to-end OSNR;

Utilizing currently observed Pre-FEC-BER and accept/deny modulation/baud rate changes on an optical carrier; and For Autonomic Optical Transport Networks, when a new network element 10 is to be added to an autonomic network, the software agent 40 on the network element 10 may be used to communicate with its proxy to reach the network registrar; and Providing secure updates and applications that may be configured to only run when signed and/or approved (for implementing licensing or security approvals).

Additionally, other uses of the software agents 40 for state and network verification and for the use of those verifications are contemplated.

CONCLUSION

Conventionally, operators of network elements waited on vendors to supply software/firmware updates and network configurations could result in failures in the network when misconfigurations were not detected before the change to the configuration. In accordance with the present disclosure, the use of software agents executed on network elements to verify the state of the network elements and of the network before applying configurations grants greater control to operators for extending NE-level functions and correctness criteria to improve network verification.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment.

What is claimed is:

1. A method, comprising:
executing, on computer hardware in a network element in a transport network, computer-executable instructions configured as one or more software agents, the computer-executable instructions causing the computer hardware to:
receive instructions to apply a configuration to the network element;
determine a state of the network element, comprising comparing a current state of transient properties of the network element against a predetermined, expected state of the transient properties of the network element;
verify a state of one or more other network elements or paths in the transport network by comparing a current state of one or more network-level constraints of the one or more other network elements or paths against a predetermined, expected state of the one or more network-level constraints on the one or more other network elements or paths;
subsequent to determining the state of the network element and verifying the state of the one or more other network elements or paths in the transport network, determine that the current state of the network element meets the predetermined, expected state, and determine that the current state of the one or more network-level constraints of the one or more other network elements or paths meets the predetermined, expected state of the one or more network-level constraints on the one or more other network elements or paths; and
positively acknowledge the instructions to apply the configuration.

2. A method, comprising:
executing, on computer hardware in a network element in a transport network, computer-executable instructions configured as one or more software agents, the computer-executable instructions causing the computer hardware to:
receive instructions to apply a configuration to the network element;
determine a state of the network element, comprising comparing a current state of transient properties of the network element against a predetermined, expected state of the transient properties of the network element;

verify a state of one or more other network elements or paths in the transport network by comparing a current state of one or more network-level constraints of the one or more other network elements or paths against a predetermined, expected state of the one or more network-level constraints on the one or more other network elements or paths;

detect a misconfiguration from the comparison of the current state to the predetermined, expected state of at least one of the current state of the network element and the current state of the one or more network-level constraints of the one or more other network elements or paths; and negatively acknowledge and reject the instructions to apply the configuration.

3. A network element in a transport network, the network element comprising:

computer hardware comprising one or more of a computer processor, an application specific integrated circuit, a field programmable gate array (FPGA), a programmable circuit board, and a microcontroller; and one or more non-transitory computer readable medium storing computer-executable instructions configured as one or more software agents that when executed by the computer hardware cause the computer hardware to:

determine a state of the network element, comprising comparing a current state of transient properties of the network element against a predetermined, expected state of the transient properties of the network element; and verify a state of one or more other network elements or paths in the transport network by comparing a current state of one or more network-level constraints of the one or more other network elements or paths against a predetermined, expected state of the one or more network-level constraints on the one or more other network elements or paths.

4. The network element of claim 3, the one or more non-transitory computer readable medium storing computer-executable instructions that when executed by the one or more computer processors further cause the computer hardware to:

receive instructions to apply a configuration to the network element;

subsequent to verifying the state of one or more other network elements or paths in the transport network, detect a misconfiguration from the comparison of the current state to the predetermined, expected state; and negatively acknowledge and reject the instructions to apply the configuration.

5. The network element of claim 3, the one or more non-transitory computer readable medium storing computer-executable instructions that when executed by the computer hardware further cause the computer hardware to:

receive instructions to apply a configuration to the network element;

subsequent to verifying the state of one or more other network elements or paths in the transport network, determine that the current state meets the predetermined, expected state; and positively acknowledge the instructions to apply the configuration.

6. The network element of claim 3, the one or more non-transitory computer readable medium storing computer-executable instructions that when executed by the computer hardware further cause the computer hardware to:

receive instructions to apply a configuration to the network element;

subsequent to determining the state of the network element, detect a misconfiguration from the comparison of the current state to the predetermined, expected state; and negatively acknowledge and reject the instructions to apply the configuration.

7. The network element of claim 3, the one or more non-transitory computer readable medium storing computer-executable instructions that when executed by the computer hardware further cause the computer hardware to:

receive instructions to apply a configuration to the network element;

subsequent to determining the state of the network element, determine that the current state meets the predetermined expected state; and positively acknowledge the instructions to apply the configuration.

8. The network element of claim 3, wherein the computer-executable instructions configured as one or more software agents are part of an operating system of the network element.

9. The network element of claim 3, wherein the computer-executable instructions configured as one or more software agents are packaged as firmware running on the computer hardware without an operating system.

10. The network element of claim 3, wherein the network element is a computer server.

11. The network element of claim 3, wherein the predetermined expected state is adjustable by one or more of: an operator of the network element and a vendor of the network element.

12. The network element of claim 3, wherein the predetermined expected state includes a threshold for the one or more network-level constraints.

13. The network element of claim 12, wherein the threshold is adjustable.

14. The network element of claim 3, wherein the transport network is an optical transport network (OTN).

15. The network element of claim 3, wherein the transport network is a packet transport network.

16. The network element of claim 3, wherein values of the transient properties are based on one or more of: persistent configuration parameters and independent, transient parameters.

17. The network element of claim 3, wherein verifying the state of one or more other network elements or paths in the transport network by comparing the current state of one or more network-level constraints of the one or more other network elements or paths against the predetermined, expected state of the one or more network-level constraints on the one or more other network elements or paths, further comprises utilizing one or more of streaming telemetry, polling, and threshold-based streaming telemetry.

18. The network element of claim 3, wherein the network-level constraints are defined by a controller positioned outside of the network element, wherein the network-level constraints comprise one or more rule governing operation of the transport network.

19. The network element of claim 18, wherein the controller is a Network Management System (NMS).

20. The network element of claim 18, wherein the controller is a Software Defined Networking (SDN) Controller.

\* \* \* \* \*